United States Patent [19]
Day

[11] 3,807,703
[45] Apr. 30, 1974

[54] MIXER-EMULSATORS

[75] Inventor: John Thomas Day, Manchester, Mass.

[73] Assignee: USM Corporation, Boston, Mass.

[22] Filed: Oct. 12, 1972

[21] Appl. No.: 297,078

[52] U.S. Cl. ................................................. 259/7
[51] Int. Cl. ............................................. B01f 7/00
[58] Field of Search ........... 259/7, 8, 23, 24, 43, 44, 259/107, 108; 23/252 R, 283

[56] References Cited
UNITED STATES PATENTS

| | | | |
|---|---|---|---|
| 3,141,865 | 7/1964 | McEvoy | 259/8 |
| 3,194,638 | 7/1965 | Neuville | 23/283 |
| 3,321,283 | 5/1967 | Ewald | 23/283 |
| 3,638,673 | 2/1972 | Stanciv | 259/8 |
| 3,684,251 | 8/1972 | Bowling | 259/8 |

*Primary Examiner*—Robert W. Jenkins
*Attorney, Agent, or Firm*—Vincent A. White

[57] ABSTRACT

Apparatus for mixing and emulsifying a multicomponent liquid mixture wherein one of said liquid components becomes the dispersed phase and a second component becomes the continuous phase of the emulsion, said apparatus including a housing having a plurality of staged, axially aligned chambers, a rotor extending axially through said housing chambers, said rotor being adapted with mixing blades to agitate the mixture in said chambers. Within said housing said aligned chambers are separated by cooperating structure of said rotor and the chamber walls forming stage separators. Said housing also includes inlet means to and discharge means from said chambers for said components of said mixture and wherein the aligned chamber form a staged reactor for certain of the added components of said mixture passing through said chambers.

7 Claims, 1 Drawing Figure

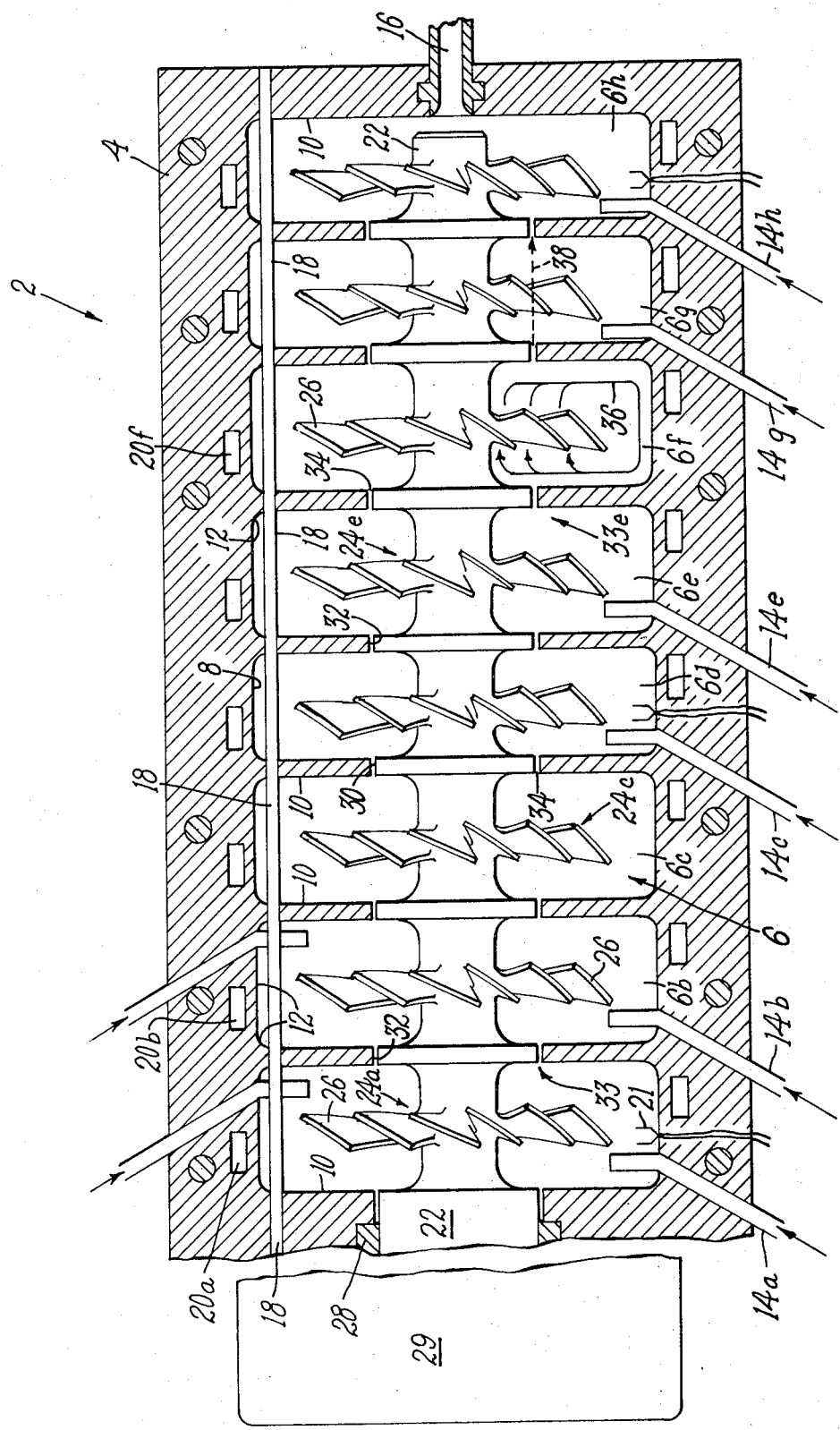

MIXER-EMULSATORS

BACKGROUND OF THE INVENTION

This invention relates to apparatus for mixing and emulsifying materials and particularly in performing addition or condensation polymerizations in which basic liquid ingredients are charged in desired amounts into the apparatus. The ingredients are then alternatively, depending upon the particular process, placed into a particular emulsion form and/or reacted to produce a synthetic polymeric material. In this regard, providing the desired emulsion in what is in effect an intimate stage, from which a specific polymeric product may then be obtained on reaction, has been and is extremely difficult to obtain. This is due to the fact that a reactive medium, in emulsion form, must be provided in which proper reactant amounts must be present and at the same time the reaction conditions must be provided. Emulsion polymerization from this standpoint then has always posed these difficult problems.

The problems then do not reside simply in the chemical aspects of polymerizing but are interconnected and depend to a large extent on the physical conditions, i. e., mechanical expedients used to prepare the emulsion polymerization ingredients as well as within which the emulsion polymerization is carried out. It is with respect to this latter that the present invention has particular significance.

Conventionally in the past, emulsion polymerizations have been produced in batch type operations. Therein equipment mixed the ingredients and provided them in the proper emulsion form, stoichiometrically and physically, and then polymerized the mix. Each operation represented the use of separate pieces of equipment with which or in which to effect those stages of the overall operation.

By way of example here, there is described a condensation polymerization wherein the process includes preparing and reacting essentially liquid mixtures to produce polyurethanes within which, at an intermediate stage, an emulsion is formed. In this process at least one liquid ingredient which is substantially insoluble in the remainder of materials is dispersed throughout the remainder of the liquid materials.

More particularly, the invention relates to apparatus for continuously mixing and emulsifying materials to be reacted to form microporous polyurethane bodies as described in U. S. Pat. No. 3,551,364 to John J. McGarr. In the process described in the McGarr patent (wherein the process is performed in a batch type process), a liquid selected to have no, or only very limited, solubility, or swelling action, is dispersed as the discontinuous phase in a reactive, polyurethane forming liquid, which is established as the continuous phase of the emulsion. Control of droplet size of the dispersed liquid is effected to control pore size in the microporous polyurethane body subsequently formed in the process.

The reacting mixture, with the dispersed liquid, may be cast on a surface and the reaction completed to form a tough, solidified material, having the droplets of non-solvent dispersed liquid entrapped in the solidified body. As described in the McGarr patent, the emulsified non-solvent liquid existing as droplets within the reacted urethane is removed without expanding the solidified body. As the emulsion droplets evaporate spaces constituting the openings or pores in the solidified material are left.

The apparatus of the present invention is adapted to continuously mix the reactive materials for forming the polyurethane and to disperse the non-solvent liquid in the reactive mixture forming the emulsion. The apparatus is capable of performing the "one-shot" manufacture of polyurethane or the two-step process where the prepolymer is made "on line". The inventive apparatus includes a plurality of in-line staged chambers, selected chambers, having at least one input port whereby the ingredients, (i.e., polyol, prepolymer, polyisocyanate, non-solvent, etc.) may be introduced. Thus, by controlling the feed rates of particular ingredients, the reactive mixture (e. g., polyurethane forming) may be generated in certain of preselected chambers and the selected non-solvent liquid may be dispersed in the reactive mixture forming a reactive emulsion in other preselected chambers.

Certain additives to the McGarr process are desirable to control particular aspects of the process or to affectt the physical properties of the product by formation. In the formation of the emulsion of non-solvent in the liquid reactive polymeric continuous phase, emulsifying agents are useful to aid in dispersing the non-solvent liquid in the polymeric material and to stabilize the resulting emulsion. Likewise, it may be desirable to add one or more catalysts to assist in control of the reaction rate of the reactive polymeric mixture in the various stages of the mixer. These reaction controls may be in addition to the control of residence time and temperature of the reacting mixture in the various stages.

The aforementioned plurality of chambers, ported and staged, provide the versatility necessary in the inventive mixer to achieve a controllable production rate reactor for such timed reactions as the manufacture of a polyurethane and permit the emulsification of ingredients to affect the physical properties of the product being performed.

SUMMARY OF THE INVENTION

This invention relates to apparatus for mixing and forming an emulsion in a multicomponent liquid mixture. The preferred embodiment of the apparatus includes a plurality of axially aligned cylindrical chambers which form a staged mixer for reacting certain of the components forming one or both of the phases of the emulsion. The apparatus includes, as certain of its features, a housing having a plurality of axially aligned cylindrical chambers. A rotor having a mixing blade extends through said housing and axially through said chambers. The rotor is adapted with land means cooperating with a bore in the base walls separating said adjacent cylindrical chambers, forming an annular orifice and defining the stage separators between said chambers. The housing is further adapted with inlet means generally into a chamber at one end thereof and discharge means in in a chamber at the other end thereof whereby certain of the components of the mixture may be introduced into said apparatus and flow sequentially through said chambers and out said discharge means. Additional inlet means may be disposed in various of said chambers whereby additional components to said mixture may be added at predetermined stages of mixing and emulsifying.

DESCRIPTION OF THE DRAWINGS

The FIGURE is an elevational view, partially in section of the apparatus embodying the invention.

DESCRIPTION OF THE PREFERRED EMBODIMENT

Referring now to the drawing, reference number 2 indicates the mixer embodying the present invention. Housing 4 contains a plurality of chambers 6, each of which is individually designated as 6a through 6h respectively. The number of chambers 6 herein disclosed is illustrative, as will be realized from the subsequent description. A predetermined number is selected to provide sufficient numbers of staged chambers for the mixing, emulsifying and reacting of the ingredients in the desired sequence, to provide the desired age distribution or history of molecules at the mixer output and to provide the heat transfer necessary to control the particular reaction.

Chambers 6 are circular in cross section in the plane perpendicular to the axis of housing 4 and in the illustrated embodiment are generally rectangular in cross section in the planes including the axis of housing 4. Where circular walls 8 join base walls 10, the corners 12 are rounded. Inlet ports 14 coupled to supply lines (not shown) serve to supply materials such as reactive ingredients and catalysts from sources (not shown) to chambers 6. Depending upon the particular reactive process being performed, none, one or more ports 14 may be necessary in each chamber 6.

Discharge means 16 such as a centrally located passage in the last chamber (6h) provides an egress for the reactive emulsion produced in mixer 2.

Baffle means 18, such as the illustrated cylindrical bars, may be disposed at intervals around the periphery of chamber 6 the purpose of which will be subsequently described. In the illustrated embodiment for practicing a continuous process to form a material according to the McGarr patent, four such bars 18 are disposed at regular intervals adjacent the perimeter of chambers 6.

Heat transfer means 20 such as well known fluidic circuits having heat removal or supply means may be disposed in or around housing 4. Heat transfer means may be individually, controlled as by thermocouple means 21 and a known control circuit (not shown) and thus operative with respect to a particular chamber (6a – 20a) if desired to control the heat energy level in a particular chamber. Heat transfer means 20 may also be a single extended integral unit as where control of the overall heat energy level of the housing 4 is sufficient. The dictates of a particular process to be controlled will determine the individual nature of the means 20.

Mixing rotor 22 is disposed centrally of chambers 6 and extends axially through housing 4. A rotor 22 extends into or through each chamber and includes shaft 23 and mixing blades 24 (designated individually as 24a through 24h). In the preferred embodiment of the invention, individual blade elements 26 of blades 24 slightly overlap adjacent elements and are inclined at an angle of approximately 20° from the plane of rotation. In the illustrated embodiment, the pitch of elements 26 is such that upon rotation of blade 24, the force imparted upon the mixed ingredients in chamber 6 is in the axial direction with the general flow of ingredients through mixer 2. Rotor 22 is mounted in bearing means 28 and may be coupled to any of a variety of known means 29 for rotary motion, such as an hydraulic or electric motor.

Rotor 22 and base walls 10 of chambers 6 cooperate to substantially isolate individual chambers (6a from 6b, etc.) from one another. Rotor 22 is adapted with annular lands 30 which extend radially in the region of walls 10 and cooperate therewith to separate the chambers 6. Lands 30 are in spaced relation to bores 32 in walls 10 and form a stage separator 33. The annular orifice 34 formed by the space between bore 32 and land 30 permits the advance of material from chamber to chamber through the described structure. Orifice 34 is disposed relative to blade 24 of a subsequent chamber so that material entering that chamber is promptly intermixed with the existing material therein. In the illustrated embodiment, a separator 33 may be in spaced relation wherein rotor 22 and bore 32 become a colloid mill and may assist in the preparation and maintenance of the desired emulsion. The spaced relation of land 30 and bore 32 is held to values consistent with known material flow and emulsion technology, orifice 34 being held to values permitting flow of the advancing reactive mixture therethrough without creating a pressure drop thereacross which would adversely affect material flow. In addition to the other functions (later elaborated) of separator 33, it may assist in the control of droplet size of the dispersed phase. However, the principal function of separators 33 is to isolate the mechanical working and reaction of one chamber from that of the adjacent chamber, while permitting the proper advance of material through the reactor stages.

In operation of the illustrated embodiment for the preparation of a reactive mixture of polyurethane forming material according to the aforementioned McGarr patent, rotor 22 is turned by motor means 29 at a relatively high rate of speed, such as 1,000 to 4,000 r.p.m. (depending upon the viscosity of the reacting materials and the predetermined throughput rate). It should be appreciated that a higher rate may be advantageous for other materials, or reaction conditions. The polymeric materials to be reacted, such as a polyol in the one shot process, (an organic compound having at least two active hydrogens) and a reactive compound (polyisocyanate) having at least two - NCO groups, may be injected into mixer 2 at chamber 6a, through ports 14a. In the case of a prepolymer, two stage process, the appropriate polyol and an excess of a polyisocyanate over the stoichiometric amount may also be supplied to chamber 6a; and the necessary chain extenders (active hydrogen containing materials) to form the desired high molecular weight material may be added at a later appropriate stage (i.e., when the prepolymer forming reaction has advanced to a suitable point - such may be seen as in chamber 6d or 6e).

As may be realized, with the initial reactive ingredients being supplied to chamber 6a, its function is primarily mixing to insure uniform reaction. As chamber 6a is filled, the mixture which may have begun its reaction is moved into the subsequent chamber 6b by virtue of the continuing supply of materials at port 14a. The material of chamber 6a is advanced into chamber 6b by virtue of its being displaced from chamber 6a as a result of material additions through ports 14a. A key to the effectiveness of uniformity of the history of reactive material mixed and emulsified in this invention is this dependence of throughput upon the component material addition as contrasted to blade element 26 effect on the advance of the mixture. This type of material advance is accomplished by the location and spacing of orifice 34 relative to blade 24, as subsequently described.

At a later chamber, such as 6b, and depending upon flow rates and the particular materials (i.e., rate of reaction), the non-solvent material to become the dispersed phase of the emulsion may be added. In the McGarr process, the amount of non-solvent liquid may vary from about 25 parts to as much as 300 parts of liquid to 100 parts of polymer. The ratio of materials may be used to help control the droplet size of non-solvent liquid dispersed into the reacting mixture. Droplet size is also affected by the degree of mixing supplied by blades 24, by the viscosity of the reacting mixture, the temperature thereof, and by its reaction rate and by the amount and type of surface active agent or emulsifier supplied. The latter may conveniently be supplied in chamber 6a with the reactive materials or into any subsequent chamber wherein the emulsion is being formed and/or maintained.

Catalysts to control the reaction rates within the mixer 2 may be added in early stages (i.e., chambers 6a – 6d). Those catalysts to control the reaction of a mixture after it has left the mixer may be conveniently added in the later stages (i.e., 6d–6h). Each stage preferably has blades 26 to mix the ingredients entering or passing therein to insure an homogenous mixture passing to the next subsequent stage. Further, separators 33 isolate each stage or chamber 6 subjecting the passing mixture to its influence to promote the dispersion of the non-solvent liquid and to regulate the uniformity of reactive mixture molecular history.

In the continuous operation of mixer 2, it may be desirable to supply heat to the early chambers to accelerate a reaction between components of the mixture. In later chambers, as the reactive mixture gets more viscous, it may be desirable to remove heat energy introduced into the system in part due to the influence of the blades 26 on the viscous mixture. In such cases, the separate heat transfer means 20 illustrated permits particularly effective control of the reaction throughout its residence time in mixer 2. Further, the extension of wall sections 10 toward rotor lands 30 increases the heat transfer surface area contact with the reactive mixture, thus increasing the heat exchange capacity of mixer 2.

Within the chambers 6, blades 24 are rotated at a high rate of speed to insure thorough mixing of ingredients added in that particular chamber. Blade elements 26 have a pitch which imparts a forward axial thrust on the mixing material in a general direction of the advance of material through housing 4. This forward thrust aids further mixing of the materials by causing a high velocity intrachamber flow of material as indicated at arrow 36. Such flow discourages the material which enters a particular chamber (such as 6f) from flowing directly through the chamber (as from orifice 34e to 34f), as shown by dotted arrow 38. If some of the mixing reacting material were allowed to traverse a chamber (6f) directly as at 38, control over residence time and homogenous mixing would be lost. The forward thrust of blades 24 provides the illustrated flow of material at arrow 36 giving a high velocity flow of material radially outward adjacent lower chamber walls 10 effectively transverse to any material flow through orifice 34 of separator 33. This transverse flow of material thus adds to the isolation of material in adjacent chambers by discouraging flow of material directly through orifice 34 as a result of the action of blade 24. Further, the high velocity flow of material through this area promotes a self-cleaning action of a chamber's wetted surface also promoting a more uniform mixing history of material with a chamber.

During the above described intrachamber flow, when the material reaches walls 8, flow continues as indicated by arrow 36, with filleted corners 12 promoting an orderly change of linear direction without material build-up. This change of direction is accomplished by assisting the mixed material to maintain a relatively uniform velocity, the rounded corners preventing any rapid drop-off of velocity of a segment of mixing material within a chamber. Rounded or filleted regions in rotor 22 have a similar effect for material returning to be forced through blades 24.

As previously mentioned, blade elements 26 are inclined, in the preferred embodiment at an angle of about 20°, to the plane of rotation. The primary function of blades 24 is to impart a high velocity swirl to the material being mixed as described. It is a further preference to minimize the heat energy input to the material due to mechanical agitation produced by blades 24. With blade elements 26 inclined to provide the above described flow around chambers 6 (according to arrow 36) efficient mixing is achieved with a minimum of heat-producing random molecular agitation.

Baffle means 18 in chamber 6 further effects the flow of the mixture components during mixing. As blades 24 rotate, the mixture in chambers 6 also tends to rotate, developing a flow parallel to the rotation of blade 24 in the region of walls 8 which is due, in part, to a turbine effect of blade 24. Under such conditions mixing material tends to stagnate along walls 8 contributing to: 1) restriction of heat flow into and out of chamber 6 to housing 4; 2) degradation of material trapped on walls 8; and 3) reduction of mixing volume effecting mixing efficiency of the mixture and residence time per chamber. Further, under such stagnation conditions, the dispersed phase of an emulsion (not yet fully formed) has a tendency to "wet" the surfaces (walls 8). Once the surface 8 or 10 becomes wetted, the collection of the dispersed phase tends to act as a lubricant on those surfaces, promoting further flow parallel to the tip of blade elements 26. The collection or pooling of the dispersed phase, in addition to the promotion of the above undesirable flow also promotes further inversion of the emulsion being formed.

Baffle means 18 disposed proximate walls 8 interrupts the above described flow parallel to blade rotation adjacent the walls by generating eddys around the bars 18. The eddy flow purges the bars 18 preventing the build-up of material thereon. Preferably, means 18 also are smooth surfaced such as the illustrated cylindrical bars so that none of the mixing material is induced to collect thereon.

It should be appreciated that due to the plurality of chambers 6, mixer 2 may be operated at a variety of throughput rates, and control of the residence times of the various phases of the reactive mixture may be achieved by adding the appropriate reactive ingredients, catalysts and non-solvent liquids at later stages than above indicated. This versatility lends the disclosed mixer adaptable to a plurality of uses, such as the formation of emulsified compounds other than polyurethanes. Size (diameter and/or depth) of individual chambers may also be varied to change the residence history of materials mixed therein.

The versatility of structure disclosed also permits the controlled manufacture of polyurethane compounds wherein the reactive, urethane forming mixture is dispersed in the non-solvent liquid. Therein, the non-solvent liquid becomes the continuous phase of the emulsion and the reacting polyurethane forming materials become the dispersed phase. The operation of the mixer-emulsator of the present invention in such a mode enables the continuous production of polyurethane powders.

Having thus described my invention, what I claim as new and desire to secure by Letters Patent of the United States is:

1. Apparatus for blending and emulsifying a multi-component liquid mixture, wherein at least one of said components is dispersed as the discontinuous phase in at least another of said components being the continuous phase of said mixture, comprising: a housing having therein a plurality of cylindrical mixing chambers, said chambers being axially aligned in said housing, and interconnected to adjacent chambers by means of a central longitudinal bore extending into said housing and through the base walls defining the ends of said cylindrical chambers, a rotor disposed in said bore, annular lands disposed on said rotor in spaced relation to the bores in said chamber base walls forming respectively a stage separator between said adjacent chambers and the spaced relation of said land and bore defining an annular connecting orifice therein, a mixing blade on said rotor in at least one of said chambers; inlet means in at least an chambers; discharge means in one of said end chamber means for rotating said blade and rotor, and means for supplying said multi-components of said mixture under pressure to said inlet means whereby said liquid components are mixed and one of said liquids is dispersed in another of said liquids and the emulsion thus formed is pumped sequentially through said chambers, annular orifices and discharge means.

2. Apparatus according to claim 1 wherein at least one of said chambers include baffle means disposed adjacent the cylindrical walls of said chambers.

3. Apparatus according to claim 1 wherein said housing includes heat transfer means disposed adjacent at least one of said chambers.

4. Apparatus according to claim 3 wherein said heat transfer means is disposed adjacent all of said chambers.

5. Apparatus according to claim 1 wherein said mixing blade comprises a plurality of elements radially disposed on said rotor in overlapping relationship extending radially beyond said orifices in said stage separators.

6. Apparatus according to claim 5 wherein said blade elements when rotated on said rotor impart an axial thrust on said multicomponent mixture generally in the direction of the flow of said mixture induced by said inlet and discharge means.

7. Apparatus according to claim 6 wherein said blade elements overlap adjacent elements.

* * * * *

PO-1050
(5/69)

UNITED STATES PATENT OFFICE
CERTIFICATE OF CORRECTION

Patent No. 3,807,703          Dated April 30, 1974

Inventor(s) John Thomas Day

It is certified that error appears in the above-identified patent and that said Letters Patent are hereby corrected as shown below:

Column 8, line 1, after least, delete "an" and before chambers, insert --one of said--;

after in (second instance) delete "one" and insert --an--

Column 8, line 2, delete "of said"

Signed and sealed this 1st day of October 1974.

(SEAL)
Attest:

McCOY M. GIBSON JR.          C. MARSHALL DANN
Attesting Officer            Commissioner of Patents